J. H. Fellows.
Building.
Nº 5,268.    Patented Sept. 4, 1847.
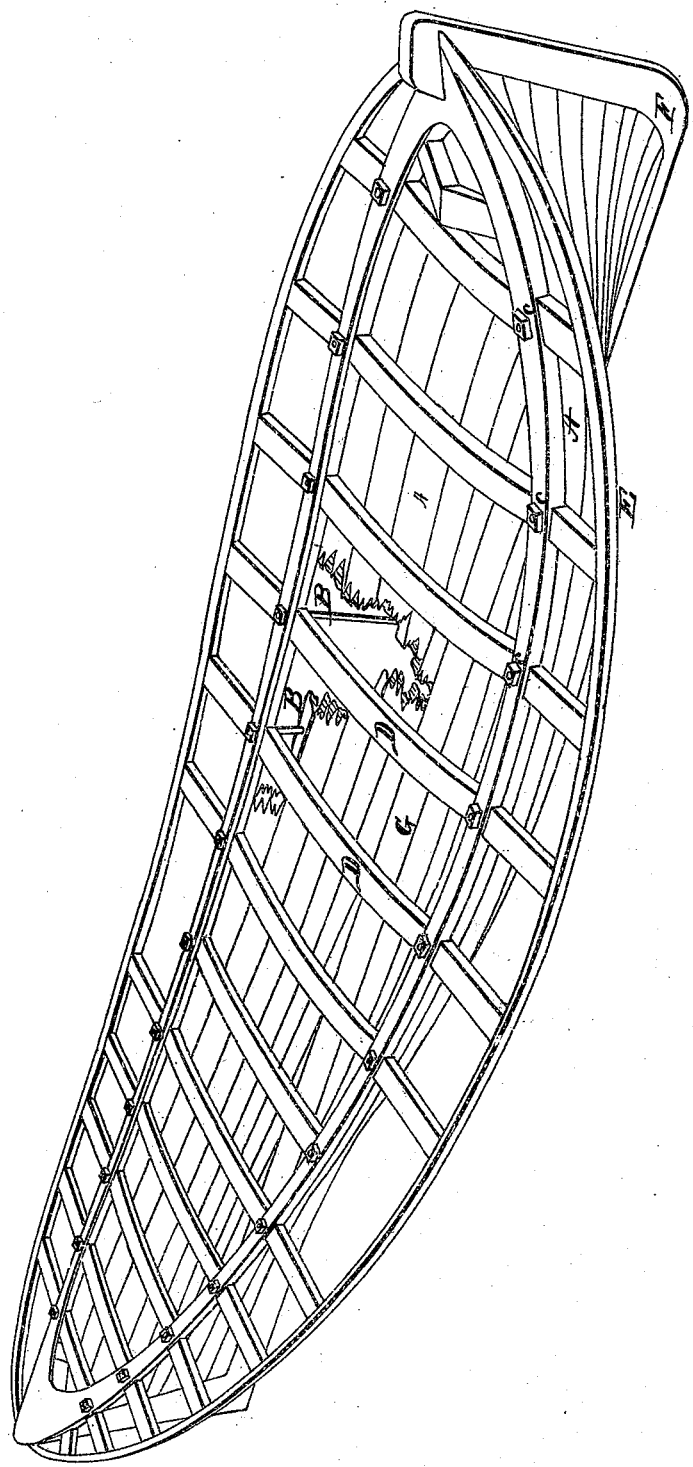

United States Patent Office.

JOHN H. FELLOWS, OF CINCINNATI, OHIO.

IMPROVEMENT IN THE CONSTRUCTION OF VESSELS.

Specification forming part of Letters Patent No. 5,268, dated September 4, 1847.

*To all whom it may concern:*

Be it known that I, JOHN H. FELLOWS, of Cincinnati, in the county of Hamilton and State of Ohio, have invented a new and Improved Mode of Constructing Hulls for Steamboats and other Vessels, so as to dispense with a timbered frame or what are called the "ribs."

The nature of my invention consists in the use of stout longitudinal planking united by iron rods passing through the planking edgewise, starting from the keel, through the bottom and side planking, and also through the deck-beams, and there secured by nuts to be screwed down, so as to bring the deck-beams and planking firmly together; and I do hereby declare that the following is a full, clear, and exact description of the construction and operation of the same, reference being had to the annexed drawing, making a part of this specification, in which—

A is to represent the longitudinal planking, and B the rods passing through the planking and deck-beams, in order to screw the whole together by the nuts C on the upper ends of the rods.

D are the deck-beams; E, the guards; F, the keel, and G the keelson.

The rods may be in one piece (extending from the keel to the deck-beams) or in short pieces, (only to go through three or more of the planks,) if required.

The advantages of this mode of constructing hulls over the present mode will create a great difference in the lightness of draft of water, also much greater durability and strength, likewise better stowage. A vessel constructed on this principle will never have occasion to be hauled out on account of leakage, for every leakage can be seen and calked on the inside while afloat. By dispensing with timbers it will prevent a great accumulation of mud, which is detrimental to the preservation of all vessels.

What I claim herein as new, and desire to secure by Letters Patent, is—

The application of rods of iron passing through the longitudinal planking and screwing them together, thereby dispensing with the timbered frame, as are required in the present mode of constructing hulls of vessels.

JOHN H. FELLOWS.

Witnesses:
A. J. DUNSHEE,
C. L. OVINGTON.